Feb. 3, 1925.   
W. E. DUNSTON   
1,525,375

BUMPER ATTACHING AND SUPPORTING MEANS

Filed May 8, 1923

Inventor  
Wayne E. Dunston  
By Hull, Buck & West  
Attys.

Patented Feb. 3, 1925.

1,525,375

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923. Serial No. 637,461.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to means for supporting bumpers from the frames of automobiles, and more particularly to the construction and arrangement of parts whereby an efficient support and connection may be afforded between such bumpers and special constructions of vehicle frames. I accomplish the foregoing general objects in and through the construction and arrangement of parts shown in the drawings forming part hereof, wherein Fig. 1 represents a perspective view of the longitudinal and transverse frame members at one side and end of an automobile, illustrating the manner of using my invention therewith; Fig. 2 a plan view of the frame members shown in the preceding view, together with a portion of a bumper connected to and supported by the arm; and Fig. 3 a detail in section corresponding to the line 3—3 of Fig. 2 and showing the body sill, which does not appear in Figs. 1 and 2.

Describing the various parts by reference characters, 1 represents the rear cross member and 2 the longitudinally extending side member of an automobile of a well-known make, the cross member or bolster having therebeneath the cross spring 3.

For the purpose of supporting a bumper from the frame of a vehicle such as indicated herein, I provide an arm 4, the outer or rear end of which is depressed, as indicated at 4ª, and which is provided at its extreme end with an eye 5 to which a clamp 6 is pivotally secured by means of a bolt 7, the said clamp being applied to the rear bar 8 of a bumper, the front bar of which is indicated at 9.

For the purpose of effecting a strong and secure connection between the arm 4 and the frame work of the automobile, the following construction is provided: the front or inner end of the arm 4 (which may be of spring-plate material) is extended by being connected to the vertical flange 10 of an angular arm or bracket, the upper flange of which is indicated at 11. Riveted or otherwise suitably secured to the vertical flange 10 is an angular bracket, comprising the vertical leg 12 and the horizontal leg 13, the latter leg being spaced from the flange 11 to provide a space therebetween for the reception of the adjacent web 1ª of the cross member or bolster 1. The inner end of the flange 13 may be secured to the web of the cross member in any convenient manner, but preferably by means of a special body bolt 14 which may be inserted from above through the body sill 15 and through the apertures in the said web and the leg 13.

The forward or inner end of the angle member 10, 11 may be secured to the longitudinal body sill 15 thereabove by means of a bolt or screw 15ª, which may be inserted from beneath and through any one of a series of bolts 16 in the flange 11.

The construction described enables me to apply the bumper supporting arms to the frame work of a vehicle of the type described and to do so in such manner as will provide a firm support for such arms and enable the impacts received by the bumpers to be distributed in a most efficient manner to the various frame members of the vehicle, enabling the parts to withstand the shocks to which they are thus subjected.

Having thus described my invention, what I claim is:

1. The combination, with a cross member and the longitudinal body sill of a vehicle, of an angular bumper supporting member having a horizontal flange adapted to rest upon the end of the cross member and having an attaching member beneath and extending substantially parallel with said flange and adapted to engage beneath the said cross member, means extending through the said flange of the attaching member and through the cross member and the body sill for securing the said flange and the said members to the said body sill, and means for securing the rear or inner end of such bumper supporting member to the said body sill.

2. The combination, with a cross member and the longitudinal body sill of a vehicle, of an angular bumper supporting member having a horizontal flange adapted to rest upon the end of the cross member and having an attaching member beneath and extending substantially parallel with said flange and adapted to engage beneath the said cross member, means extending through the said flange of the attaching member and through the cross member and the body sill for securing the said flange and the said members to the said body sill, and a lag screw cooperating with one or more apertures at the rear or inner end of such bumper supporting member for securing the same to the said body sill.

In testimony whereof, I hereunto affix my signature.

WAYNE E. DUNSTON.